United States Patent Office

2,940,814

VAT DYE COMPOSITIONS CONTAINING PYRIMIDINES

John Taras, Alpha, N.J., assignor to General Aniline & Film Corporation, New York, N.Y., a corporation of Delaware No Drawing. Filed Dec. 4, 1953, Ser. No. 396,349

6 Claims. (Cl. 8—35)

This invention relates to vat dye compositions and particularly to vat dyestuff compositions containing pyrimidines for the printing of textile fibers.

The printing of textile materials with ester salts of leuco vat dyestuffs is well known to the art. The process involves dissolving the ester salt of the leuco vat dyestuff in water and adding a thickening agent to form the printing paste which is applied to the textile material in several known ways, after which the insoluble parent vat dyestuff is fixed on the fibers by the hydrolysis and oxidation which takes place in the "ageing" process which is generally one of two kinds. In the acid ageing process for the development of the print, acid steam is applied along with treatment of the impregnated fabric with an acid solution of an oxidizing agent. Where an acid-liberating agent and an oxidizing agent have been incorporated in the printing paste, development of the print takes place with the application of ordinary steam. The printed material is then rinsed, soaped and finished.

The solubility in water of the ester salts of the leuco vat dyestuffs is due to the presence in the molecule of one or more polybasic and ester groups. This solubility varies widely and is dependent chiefly on the character of the parent vat dyestuff. In the case of the sodium salts of the sulfuric acid esters of the leuco vat dyestuffs, some of these are easily soluble in water, whereas others, being considerably less soluble, are readily salted out by the presence in the printing paste of electrolytes usually employed in the printing, most commonly ammonium thiocyanate for the acid-liberating function, and sodium chlorate for the oxidation step. The selection of vat dyestuffs for use in the printing of textiles is accordingly limited to those, the leuco ester salts of which possess the required solubility in water.

In the interest of providing stable printing pastes containing a soluble salt of the sulfuric acid ester of leuco vat dyestuffs and of employing therein leuco ester salts of low solubility, thus to provide a wider range of selection in the vat dyestuffs, more work has been done by way of adding to the printing compositions various quantities of organic solvents such as alcohols, ethylene glycol, etc., and of other printing assistants of a variety of chemical species. Despite the many excellent printing assistants which have been added to printing pastes, there are certain vat dyestuffs, for example, 2,1-naphthioindigo, which yield sulfuric acid ester salts which are so difficultly soluble in water which renders printing impossible unless there is formulated into the print paste certain so-called solubilizing agents.

We have found that improved dyestuff compositions containing salts of polybasic acid esters, especially sulfuric acid esters of leuco vat dyestuffs (hereinafter referred to for sake of simplicity as ester salts of leuco vat dyestuffs) are readily obtained by incorporating with the ester salt of the leuco vat dyestuff a pyrimidine which is characterized by the following general formula:

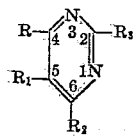

wherein R and $R_2$ represent either an amino, hydrogen, hydroxy or methyl group, $R_1$ represents either hydrogen, methyl or ethyl group, and $R_3$ represents either an amino, hydrogen, hydroxy, methyl, phenyl or oxo group.

As examples of the pyrimidines characterized by the foregoing general formula, the following are illustrative:

Pyrimidine
2-methylpyrimidine
4-methylpyrimidine
5-methylpyrimidineuracil (2,4-dihydroxypyrimidine)
6-methyluracil (2,4-dihydroxy-6-methylpyrimidine)
2,4-dimethylpyrimidine
2,4-dimethyl-6-aminopyrimidine
4,5-dimethylpyrimidine
4,6-dimethylpyrimidine
2-aminopyrimidine
2,4,6-triaminopyrimidine
2-phenyl-4-methylpyrimidine
2-phenyl-4,6-dimethylpyrimidine
2-hydroxy-4-amino-5-methylpyrimidine
2-hydroxy-4-aminopyrimidine
1,3-dimethyl-4-amino-violuric acid
4-methyl-2-ethylpyrimidine
4-methyl-5-ethylpyrimidine
5-methyl-2,4-diethylpyrimidine
5-ethyl-pyrimidine The incorporation of the foregoing pyrimidines into compositions of ester salts of leuco vat dyestuffs not only improves the solubility of the less soluble ester salts of the leuco vat dyestuffs, but also yields superior print paste stability, superior tinctorial quality of the textile prints, both in respect to tinctorial strength and brilliancy, and superior print paste solubility.

The foregoing pyrimidine compounds, which are known and readily prepared by the methods disclosed in the literature, may be incorporated directly into the printing pastes, or they may be first mixed with the ester salt of the leuco vat dyestuff. They may be used singly or in admixture with one another. The amount of the pyrimidines or mixtures thereof which may be incorporated into the dyestuff compositions may be very considerable. For example, the amount utilized in one case may depend upon the solubility of the ester salt of the vat dyestuff as well as the activity of the particular pyrimidine or pyrimidine mixture employed. For practical purposes regardless of the solubility of the ester salt of the vat dyestuff, we have found that superior print paste solubility, superior tinctorial properties and superior print paste stability are obtained when from about one-quarter to four parts by weight of the pyrimidine compound or mixtures thereof are used for each part of the parent vat dyestuff of the ester salt. In addition, in many cases an excess of the pyrimidine or mixtures thereof may be used, the excess merely acting as a diluent. The unusual aspect of the pyrimidines and mixtures thereof is that they do not interfere with the other agents normally employed in the preparation of printing pastes containing salts of sulfuric acid esters of leuco vat dyestuffs. Thus, in preparing printing pastes or powders with these vat dyestuffs ester salts, the pyrimidines or mixtures thereof may be used to replace part of the water or the solid diluent in the standardization of the dyestuff composition. Additional substances having diluent, anti-foaming, wetting, catalytic or other desired action, may be included in the dyestuff compositions prepared in accordance with the present invention. The various substances that may be so employed are well known to the art and need not be exemplified herein. However, for purposes of specific illustration such substances as sodium sulfate or sodium carbonate will serve as diluents or alkaline agents, organic fillers such as Dextrose, dextrines and the like, and catalytic substances such as ammonium vanadate and the like.

The ester salts of leuco vat dyestuffs useful in the preparation of the printing paste compositions of the present invention include all of those that are prepared from various classes of vat dyestuffs such as, for example, vat dyestuffs containing the anthraquinone-acridine, dibenzanthrone, isodibenzathrone, anthanthrone, dianthraquinone-azine, anthraquinone-diphenylthiazole, nucleus and the like; which may be found in various literature including the "Color Index" No. 1094ff and 1177ff, pages 248–291. Inclusive of such dyes are also leuco ester salts of vat dyes and leuco compounds of vat dyes prepared by careful acidification of an alkaline vat. A particularly valuable class of these ester compounds of the alkali metal, such as sodium and potassium and amine salts, such as trimethyl amine and triethanol amine salts of polybasic acid esters of leuco vat dyestuffs. The polybasic acid esters may be prepared either from sulfuric or phosphoric acid.

By the term "leuco vat dyestuffs" as employed herein is meant the reduced or vatted form of anthraquinone, indigoid or thioindigoid dyestuffs, such as those described in U.S.P. 1,639,206; 1,668,392, 1,747,107, 1,646,018, 1,448,251, 1,448,231, 1,880,996, 1,826,720; British Patents 473,471 and 438,841, German Patents 441,101, 516,845, 486,174, 491,876, and the like. While the pyrimidines of the present invention may be used with all of the classes of salts of esters and leuco vat dyestuffs they are especially adaptable for the less soluble leuco vat dyestuffs.

As specific examples of the salts of the polybasic acid esters of the leuco form of vat dyes which may be employed in the preparation of printing paste compositions, the following are illustrative:

(1) The disodium salt of the disulfuric acid ester of the leuco form of the anthraquinone-acridine dye of the following formula:

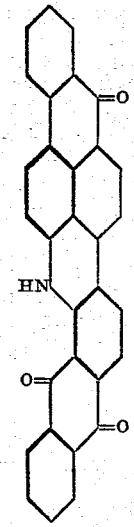

(2) The disodium salt of the disulfuric acid ester of the leuco form of the dinaphthioindigo of the following formula:

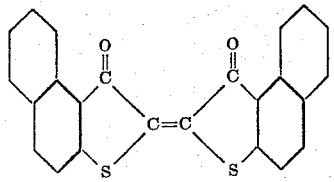

(3) Disodium salt of the sulfuric acid ester of the leuco form of 2,1,5,4-anthraquinone-di-phenylthiazole of the following formula:

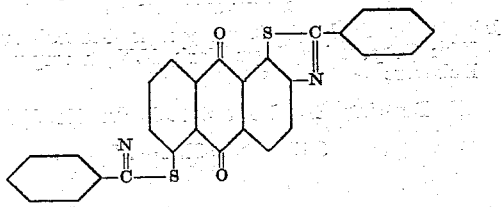

(4) Disodium salt of the sulfuric acid ester of the leuco form of the dibromo-anthanthrone of the following formula:

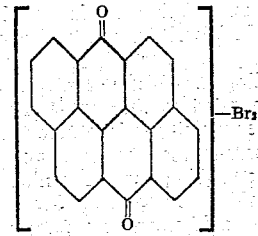

(5) Disodium salt of the sulfuric acid of the leuco compound of chlorinated iso-dibenzanthrone of the following formula:

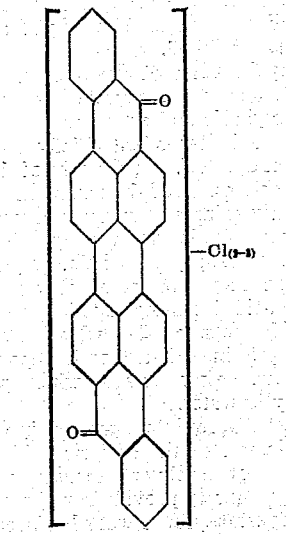

(6) Tetra-potassium salt of the sulfuric acid ester of 3,3'-dichlorodi-anthrahydroquinone azine of the following formula:

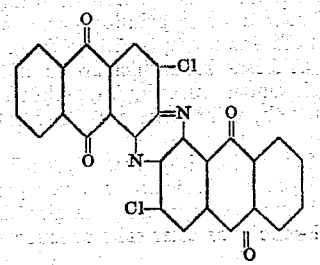

(7) Dipotassium salt of the acid sulfuric acid of the leuco compound of dimethoxy-dibenzanthrone:

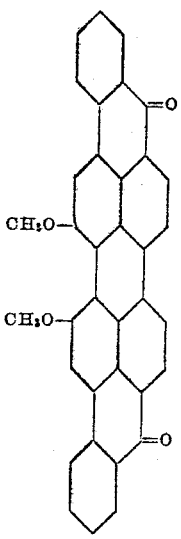

(8) Dipotassium salt of the acid sulfuric acid ester of the leuco compound of dimethyl-dibenzanthrone of the following formula:

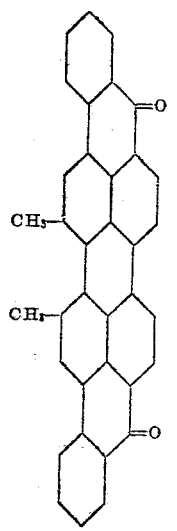

(9) Dipotassium salt of the sulfuric acid ester of the leuco form of dinaphthioindigo of the following formula:

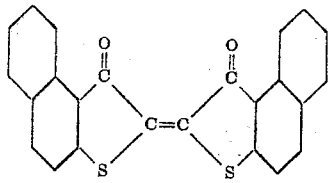

The following examples will show the manner in which the present invention may be practiced. All the parts given therein are by weight unless otherwise specified. It is to be noted, however, that the invention is not to be limited to these examples since many changes may be made in the materials treated and their proportions, manipulative steps, and other conditions without departing from the scope and spirit of the invention claimed.

*Example I*

A. A print past is prepared from the following dyestuff composition:

4 parts of a dry dyestuff composition containing
1.06 parts of the sodium salt of the sulfuric acid ester of the leuco compound of the anthraquinone acridine dyestuff of illustration 1
2 parts 2-amino pyrimidine
4 parts β,β'-dihydroxy diethyl sulfide
4 parts urea and finally dissolving by adding
16 parts warm water and holding in a boiling water bath for 2 minutes The solution is then mixed with 60 parts of starch-tragacanth
4 parts of a 35% sodium chlorate solution
2 parts of 1% ammonium vanadate solution
2 parts 28% ammonia
2 parts 50% gluconic acid solution B. A print paste is prepared as in A with the exception that the 2 amino pyrimidine is omitted and 18 parts water are used instead of the 16 parts used in A.

Cotton cloth is printed with a portion of each of the printing pastes A and B. After drying the printed cloth is subjected to a steam ageing process by exposing it for about 10 minutes to the action of steam. The development is completed after the cotton cloth is subjected to rinsing, soaping and finishing in the usual manner.

The printing paste prepared from the dyestuff composition A containing 2-amino pyrimidine yields an olive green shade which is stronger, brighter and more level than that produced with the printing paste made from the dyestuff composition B not compounded with the 2-amino pyrimidine.

*Example II*

A. A powdered dyestuff composition is prepared by grinding together in the dry state, screening and milling:

100 parts of a dry dyestuff composition containing
40.3 parts of the same parent vat dye used in Example I
40 parts pyrimidine
13 parts sodium sulfate The final concentration of the vat dyestuff in the dry composition is 26.6%.

B. A powdered dyestuff composition is made up as in A with the exception that the 2-amino pyrimidine is omitted and 53 parts of the diluent sodium sulfate is substituted therefor. The concentration of the vat dyestuff in the dry composition is the same (26.6%).

A printing paste is prepared from each of these dyestuff compositions, A and B, in the following manner:

4 parts each of the dyestuff compositions A and B is separately mixed with
4 parts β,β'-dihydroxy diethyl sulfide
4 parts urea and finally dissolved by adding
18 parts warm water and holding in a boiling water bath for 2 minutes These solutions are then each mixed with:

60 parts of starch-tragacanth thickening and
4 parts of a 35% sodium chlorate solution
2 parts 1% ammonium vanadate solution
2 parts 28% ammonia
2 parts 50% gluconic acid solution Cotton cloth is printed with a portion of each of the printing pastes as they are prepared. The printing is performed as in Example I.

The printing paste prepared from the dyestuff composition A containing 2-amino pyrimidine yields an olive green shade which is stronger, brighter and more level than that produced with the printing paste made from the dyestuff composition B not compounded with pyrimidine.

*Example III*

A textile printing paste is prepared as in Example I but containing 1.6 grams 6-methyl uracil in place of the 2-amino pyrimidine.

Cotton prints were obtained which were more than 20% stronger and brighter than those obtained in the absence of the uracil.

Another portion of each of the printing pastes is permitted to stand for 7 days and then cotton prints are made from each paste. The prints made from the paste formulated with 6-methyl uracil were stronger and brighter than those compounded without the uracil.

*Example IV*

A. A print paste is prepared from the following dyestuff composition:

4 parts of a dry dyestuff composition containing
1.06 parts of the same vat dyestuff used in Example I
1.6 parts 6-methyl uracil
4 parts β,β'-dihydroxy-diethyl-sulfide
4 parts urea and finally dissolving by adding
15.4 parts warm water and holding in a water bath for 2 minutes The solution is then mixed with:

60 parts starch-tragacanth thickening and
4 parts 25% sodium chlorate solution
2 parts 1% ammonium vanadate solution
1 part 28% ammonia and
4 parts ammonium sulfocyanide B. A print paste is prepared as in A with the exception that the 6-methyl uracil is omitted and water is substituted for it.

Cotton prints are made from each of these printing compositions.

The cotton prints obtained from the composition A formulated with 6-methyl uracil are stronger and brighter than those obtained from B.

*Example V*

A textile printing paste is prepared as in Example I but containing 0.5 part uracil.

Cotton prints were obtained which were stronger and brighter than those obtained in the absence of the uracil.

*Example VI*

A textile printing paste is prepared as in Example I using the same sulfuric acid ester salt as in that example but containing as the printing assistant 0.5 part of 1,3-dimethyl-4-amino-violuric acid of the following structure:

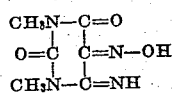

Cotton prints were obtained which were stronger and brighter than those obtained in the absence of the violuric acid derivative.

*Example VII*

A textile printing paste is prepared as in Example I using the same sulfuric acid ester salt as that described in that example but using 2 parts 1,3-dimethyl-4-amino-violuric acid. Cotton prints were obtained which were stronger and brighter than those obtained in the absence of the violuric acid derivative.

*Example VIII*

A textile printing paste is prepared as in Example I but using ½ part the sodium salt of 4-amino-2,6-dioxy-hexahydropyrimidine.

Cotton prints were obtained which were stronger, smoother and brighter than those obtained without the use of the pyrimidine derivative.

*Example IX*

A textile printing paste is prepared as in Example I using the same surfuric acid ester salt as that described in that example but using:

1 part 2-amino pyrimidine and
1 part 2-hydroxy methyl benzimidazole

Cotton prints were obtained which were stronger, smoother and brighter than those obtained from a paste formulated without the mixture of the two printing assistants.

*Example X*

A. A print paste is prepared from the following dyestuff composition:

4 parts of a dry dyestuff composition containing the disodium salt of the acid sulfuric acid ester of the leuco compound of chlorinated isodibenzanthrone (mixture of di- and tri-chlorinated iso-dibenzanthrone) of illustration 5 (equivalent to 1.05 parts of the parent vat dye)
2 parts 2,4,6 triamino pyrimidine
4 parts β,β'-dihydroxy diethyl sulfide
4 parts urea and finally dissolving by adding
16 parts warm water and holding in a boiling water bath for 2 minutes The solution is then mixed with 60 parts starch-tragacanth thickening and
4 parts of a 35% sodium chlorate solution
2 parts 1% ammonium vanadate solution
2 parts 28% ammonia
2 parts 50% gluconic acid solution B. A print paste is prepared as in A with the exception that the 2,4,6 triamino pyrimidine is omitted and water is substituted for it.

Cotton cloth is printed with a portion of each of the printing pastes A and B. The printing is performed as in Example I.

The printing paste prepared from the dyestuff composition A containing 2,4,6-triamino pyrimidine yields prints that are stronger, brighter and smoother than those obtained from printing compositions B.

*Example XI*

A textile printing paste was prepared as in Example X but containing 0.5 part of the sodium salt of 4-amino-2,6-dioxyhexahydro pyrimidine in place of the 2,4,6-triamino pyrimidine.

Cotton prints were obtained which were stronger and brighter than those obtained in the absence of the pyrimidine derivative.

*Example XII*

A textile printing paste was prepared as in Example X but containing 1.6 parts of 6-methyl uracil in place of the 2,4,6-triamino pyrimidine.

Cotton prints were obtained which were much stronger than those obtained from a similar paste formulated without 6-methyl uracil.

*Example XIII*

A. A print paste is prepared from the following dyestuff composition:

4 parts of a dry dyestuff composition containing the disodium salt of this acid sulfuric acid ester of the leuco compound of chlorinated iso-dibenzanthrone (mixture of di- and tri-chlorinated iso-dibenzanthrone) of illustration 5 (equivalent to 1.05 parts of the parent vat dye)
1.6 parts of 2-hydroxy-4-aminopyrimidine
4 parts β,β'-dihydroxy-diethyl sulfide
4 parts urea and finally dissolved by adding
15.4 parts warm water and holding in a water bath for 2 minutes The solution is then mixed with 60 parts starch-tragacanth thickening and
4 parts 25% sodium chlorate solution
2 parts 1% ammonium vanadate solution
1 part 28% ammonia and
4 parts ammonium sulfocyanide B. A print paste is prepared as in A with the exception that the 2-hydroxy-4-aminopyrimidine is omitted and water is substituted for it.

Cotton prints are made from each of these printing compositions.

The cotton prints obtained from the composition A formulated with 2-hydroxy-4-amino pyrimidine were tinctorially much stronger than those obtained from B.

*Example XIV*

A. A print paste is prepared from the following dyestuff composition:

4 parts of a dry dyestuff composition containing the disodium salt of the acid sulfuric acid ester of the leuco compound of chlorinated iso-dibenzanthrone (mixture of di- and tri-chlorinated iso-dibenzanthrone) (equivalent to 1.05 parts of the parent vat dye)
3.2 parts of 2-methylpyrimidine
4 parts of β,β'-dihydroxy-diethyl sulfide
4 parts urea
16.8 parts warm water and holding in a boiling water bath for 2 minutes The solution is then mixed with:

60 parts starch tragacanth thickening and
8 parts 16.6% sodium chromate solution B. A print paste is prepared as in A with the exception that the 2-methyl pyrimidine is omitted and water is substituted for it.

Cotton cloth is printed with a portion of each of the printing pastes thus prepared. After drying, the printed cloth is subjected to an acid fume steaming process by exposing it for about 10 minutes to a mixture of acetic and formic acid fumes. The development is completed after the cotton cloth is subjected to rinsing, soaping and finishing in the usual manner.

The cotton prints obtained from the composition A formulated with 2-methyl pyrimidine are stronger and much bluer than those obtained from B.

*Example XV*

A textile printing paste is prepared as in Example X but containing 0.5 part of 2,4-dimethyl pyrimidine in place of the 2,4,6 triamino pyrimidine.

Cotton prints were obtained which were stronger and brighter than those obtained without the use of 2,4-dimethylpyrimidine.

*Example XVI*

A. A print paste is prepared as follows:

4 parts of a paste composition containing the dipotassium salt of the acid sulfuric acid ester of the leuco compound of dimethoxy-dibenzanthrone of illustration 7 (equivalent to 0.54 part of the parent vat dye)
½ part of 1,3-dimethyl-4-amino-violuric acid
4 parts β,β'-dihydroxy-diethyl sulfide
4 parts urea and finally dissolving by adding
16.5 parts warm water and holding in a boiling water bath for 2 minutes The solution is then mixed with 60 parts starch-tragacanth thickening and
4 parts 35% sodium chlorate solution
2 parts 1% ammonium vanadate solution
2 parts 28% ammonia
2 parts 50% gluconic acid solution B. A print paste is prepared as in A but the 1,3-dimethyl-4-amino violuric acid is omitted.

Cotton cloth is printed with a portion of each of the print pastes A and B.

The prints obtained from print paste A were stronger and brighter than those obtained from print paste B formulated without the violuric acid derivative.

*Example XVII*

A textile printing paste is prepared as in Example XVI using the same leuco sulfuric acid di-potassium salt of dimethoxy-dibenzanthrone but containing 0.5 part of the sodium salt of 4-amino-2,6-dioxy-hexahydro pyrimidine in place of the violuric acid derivative.

Cotton prints were obtained which were stronger and brighter than those obtained without the use of the pyrimidine derivative.

I claim:

1. A dyestuff composition comprising a salt of an acid polybasic acid ester of a leuco vat dyestuff and a pyrimidine characterized by the following general formula:

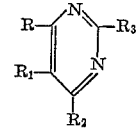

wherein R and $R_2$ represent a member selected from the class consisting of amino, hydrogen, hydroxy and methyl groups, $R_1$ represents a member selected from the class consisting of hydrogen, methyl and ethyl group, and $R_3$ represents a member selected from the class consisting of amino, hydrogen, hydroxy, methyl, and phenyl groups.

2. A dyestuff composition according to claim 1 wherein the pyrimidazole is 2-amino pyrimidine.

3. A dyestuff composition according to claim 1 wherein the pyrimidazole is 6-methyl uracil.

4. A dyestuff composition according to claim 1 wherein the pyrimidazole is 2,4,6-triamino pyrimidine.

5. A dyestuff composition according to claim 1 wherein the pyrimidazole is 2-hydroxy-4-amino pyrimidine.

6. A dyestuff composition according to claim 1 wherein the pyrimidazole is uracil.

References Cited in the file of this patent

UNITED STATES PATENTS

| | | |
|---|---|---|
| 2,024,502 | Berthold | Dec. 17, 1935 |
| 2,372,370 | Duport | Mar. 27, 1945 |
| 2,389,245 | Wiazmitinow | Nov. 20, 1945 |
| 2,406,586 | Clark | Aug. 27, 1946 |
| 2,540,799 | Taras | Feb. 6, 1951 |
| 2,559,807 | Topham | July 10, 1951 |